(12) United States Patent
Karame et al.

(10) Patent No.: US 9,787,469 B2
(45) Date of Patent: Oct. 10, 2017

(54) METHOD AND SYSTEM FOR ENCRYPTING DATA

(71) Applicant: NEC EUROPE LTD., Heidelberg (DE)

(72) Inventors: Ghassan Karame, Heidelberg (DE); Claudio Soriente, Zurich (CH); Srdjan Capkun, Zurich (CH)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 14/786,996

(22) PCT Filed: Apr. 24, 2014

(86) PCT No.: PCT/EP2014/058397
§ 371 (c)(1),
(2) Date: Oct. 26, 2015

(87) PCT Pub. No.: WO2014/174044
PCT Pub. Date: Oct. 30, 2014

(65) Prior Publication Data
US 2016/0087790 A1    Mar. 24, 2016

(30) Foreign Application Priority Data
Apr. 24, 2013 (EP) .................................. 13165184

(51) Int. Cl.
*H04L 29/06* (2006.01)
*H04L 9/06* (2006.01)

(52) U.S. Cl.
CPC .......... *H04L 9/0618* (2013.01); *H04L 9/0637* (2013.01)

(58) Field of Classification Search
CPC .................................................... H04L 9/0618
See application file for complete search history.

(56) References Cited

U.S. PATENT DOCUMENTS

| | | | |
|---|---|---|---|
| 5,737,415 A * | 4/1998 | Akiyama | G06F 21/10 705/53 |
| 9,294,444 B2 * | 3/2016 | O'Hare | G06F 21/606 |

(Continued)

FOREIGN PATENT DOCUMENTS

| | | |
|---|---|---|
| EP | 2148462 A1 | 1/2010 |
| JP | 2000092044 A | 3/2000 |
| JP | 2009139990 A | 6/2009 |

OTHER PUBLICATIONS

Valer Canda; Tran Van Trung: "A New Mode of Using All-or-Nothing Transforms", Tatra Mountains Mathematical Publications, Dec. 2006, pp. 159-168, XP002728449, Bratislava ISSN: 1338-9750 Retrieved from the Internet: URL: http://www.sav.sk/index.php?lang=en&charset=ascii&doc=journal-list&part=list_articles&journal_issue_no=1641#abstract_3395, p. 161-p. 163.

McEvoy R P et al: "Efficient all-or-nothing encryption using CTR mode", SECRYPT 2006. International Conference on Security and Cryptography, SECRYPT 2006. International Conference on Security and Cryptography, Portugal, Jan. 1, 2006 (Jan. 1, 2006), pp. 302-310, XP007907101, pp. 93-99.

(Continued)

*Primary Examiner* — Shawnchoy Rahman
(74) *Attorney, Agent, or Firm* — Leydig, Voit & Mayer, Ltd.

(57) ABSTRACT

A method for encrypting data based on all-or-nothing encryption. Data to be encrypted and an encryption key are provided. The data is divided into an odd number of blocks, wherein each of the odd number of blocks has the same size. The blocks are encrypted with the encryption key to obtain an intermediate ciphertext that includes the encrypted blocks. The intermediate ciphertext is linearly transformed based on additive contravalence operations to obtain a final ciphertext.

15 Claims, 2 Drawing Sheets

(56) References Cited

U.S. PATENT DOCUMENTS

| | | | |
|---|---|---|---|
| 2002/0062415 A1* | 5/2002 | Wang | G06F 13/1605 710/240 |
| 2004/0170277 A1* | 9/2004 | Iwamura | H04L 9/36 380/217 |
| 2005/0175175 A1* | 8/2005 | Leech | H04L 9/0637 380/29 |
| 2009/0158052 A1 | 6/2009 | Yasuda et al. | |
| 2012/0047339 A1* | 2/2012 | Decasper | G06F 11/1076 711/162 |
| 2012/0250856 A1* | 10/2012 | Pasini | H04L 9/0637 380/37 |
| 2013/0145169 A1* | 6/2013 | Poovendran | H04L 9/3244 713/181 |
| 2016/0173276 A1* | 6/2016 | Minematsu | G09C 1/00 380/28 |

OTHER PUBLICATIONS

Valer Canda and Tran van Trung, A New Mode of Using All-or-Nothing Transforms, 2002 IEEE International Symposium on Information Theory, U.S., IEEE Information Theory Society, Jul. 30, 2002, p. 296.
D. R. Stinson, Something Abouth All or Nothing (Transforms), pp. 1-6, Jun. 17, 1999.
Ronald L. Rivest, All-or-Nothing Encryption and the Package Transforms, Fast Software Encryption, $4^{th}$ International Workshop, FSE'97 Haifa, Israel, Jan. 20-22, 1997, Proceedings, Germany, Springer Berlin Heidelberg, Jan. 20, 1997, pp. 210-218.

* cited by examiner

Algorithm 1 All-or-nothing CBC Encryption Mode (ANCBC). $\lambda$ is the block size of the cipher.

Require: $p_1, \ldots, p_n$; $n \mod 2 \equiv 1$, $k$, $Enc(\cdot)$.
Ensure: $c_1, \ldots, c_n$ 1: $IV \leftarrow \{0,1\}^\lambda$
2: $\bar{c}_0 = IV$
3: for i=1,...,n do
4: $\quad \bar{c}_i = Enc_k(p_i \oplus \bar{c}_{i-1})$
5: end for
6: $t = \bar{c}_0 \oplus \cdots \oplus \bar{c}_n$
7: for i=0,...,n do
8: $\quad c_i = t \oplus \bar{c}_i$
9: end for

Fig. 1

METHOD AND SYSTEM FOR ENCRYPTING DATA

CROSS REFERENCE TO RELATED APPLICATIONS

This application is a U.S. National Phase application under 35 U.S.C. §371 of International Application No. PCT/EP2014/058397 (WO 2014/174044 A1), filed on Apr. 24, 2014, and claims benefit to European Patent Application No. EP 13165184.6, filed Apr. 24, 2013.

FIELD

The present invention relates to a method for encrypting data based on an all-or-nothing encryption and to a system for encrypting data based on an all-or-nothing encryption

BACKGROUND

Cloud security is gaining more and more importance in many applications and services nowadays. One of the important techniques that can be used to strengthen confidentiality of data stored in the cloud is the so-called all-or-nothing encryption. All-or-nothing encryption provides semantic security of data while guaranteeing that the data can only be recovered if and only if all blocks of a ciphertext are available for download by or known to a given client. Therefore all-or-nothing encryption does not solely rely on the secrecy of the encryption key for the data: In order to acquire any meaningful information of the input plaintext it is required that any adversary has access to all the data or blocks of the ciphertext respectively. Therefore all-or-nothing encryption ensures a transparent key management process and naturally complement information dispersal techniques that can be used to efficiently store the data in a distributed storage like cloud storage.

Conventional all-or-nothing encryptions are for example disclosed in the non-patent literature of R. Rivest, "All-or-Nothing Encryption and The Package Transform," In Proceedings of Fast Software Encryption, pages 210-218, 1997, or in the non-patent literature of Victor Boyko, "On the Security Properties of OAEP as an All-or-Nothing Transform," CRYPTO 1999:503-518. 1998.

Another conventional all-or-nothing-encryption is disclosed in the non-patent literature of D. R. Stinson, "Something About All or Nothing (Transforms)," In Designs, Codes and Cryptography, pages 133-138, 2001.

Most of these conventional techniques add an encryption layer after an all-or-nothing transformation of the all-or-nothing encryption. Therefore conventional all-or-nothing encryptions require at least two rounds of encryption, wherein the all-or-nothing transformation is achieved using encryption, which makes these conventional all-or-nothing encryptions inefficient in particular when dealing with large files.

SUMMARY

According to an embodiment, a method is provided for encrypting data based on all-or-nothing encryption. The method includes providing data to be encrypted and an encryption key, dividing the data to be encrypted into an odd number of blocks, wherein each of the odd number of blocks has the same size, encrypting the blocks, with the encryption key to obtain an intermediate ciphertext that includes the encrypted blocks, and linear transforming the intermediate ciphertext based on additive contravalence operations to obtain a final ciphertext.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following:

FIG. 1 shows steps of a method based on an all-or-nothing encryption of data according to a first embodiment of the present invention.

DETAILED DESCRIPTION

Figure 2:
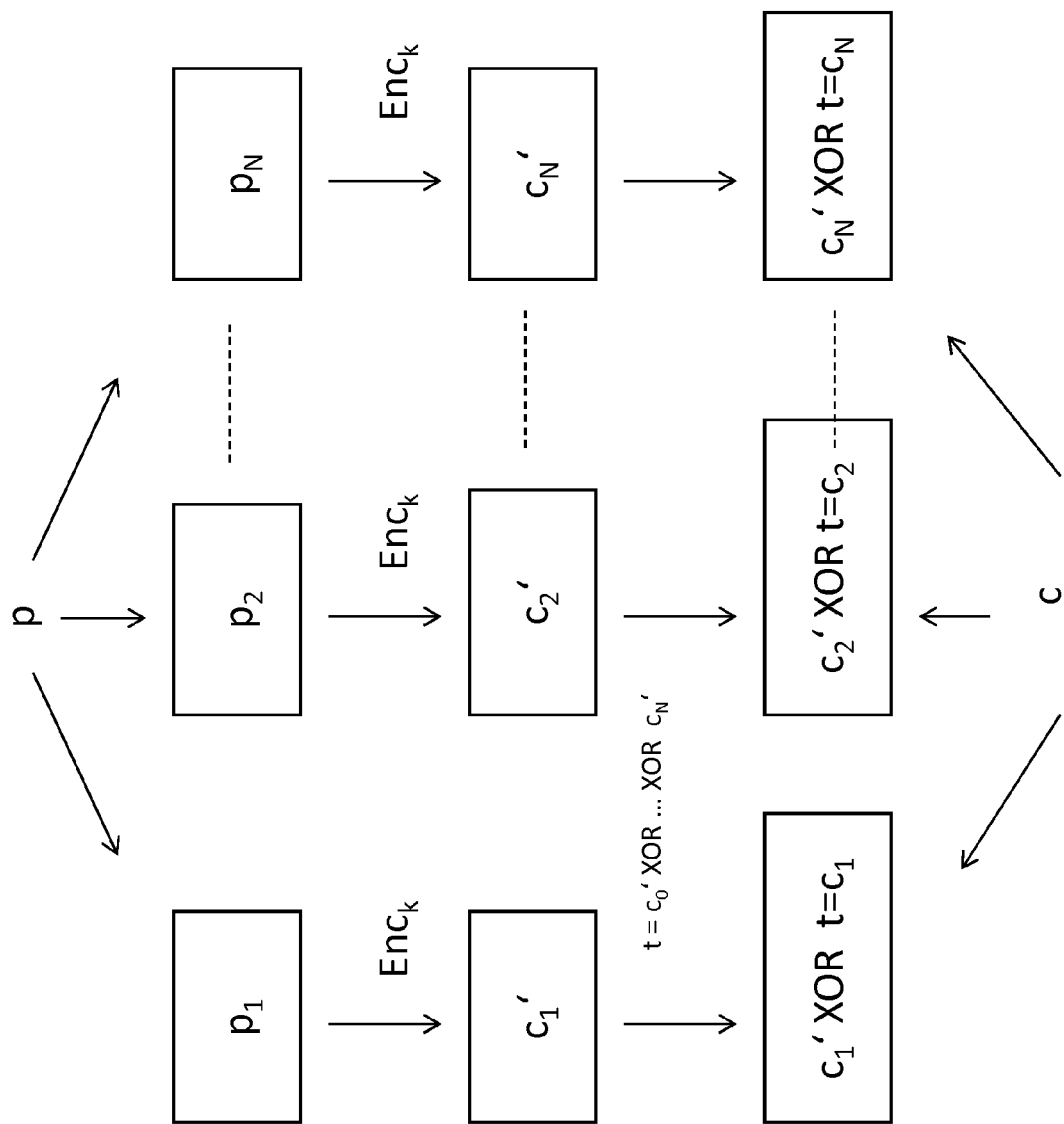
FIG. 2 shows principal steps of a method according to a second embodiment of the present invention.

In an embodiment, the present invention provides a method and a system for encrypting data based on an all-or-nothing encryption, the method and the system capable of being more efficient, in particular with regards to improving a performance, as compared to conventional all-or-nothing encryptions.

In an embodiment, the present invention provides a method and a system for encrypting data based on an all-or-nothing encryption which are semantically secure and which do not allow a recovery of plaintext-even if the encryption key is known to an adversary.

Although applicable to security in general the, present invention will be described herein with regard to cloud security.

A method according to an embodiment of the invention includes a) providing data to be encrypted, preferably in form of a plaintext bitstream, and an encryption key, preferably wherein the encryption key may be secret or publicly known, b) dividing said data into an odd number of blocks, such that each of said blocks has the same size, c) encrypting said blocks, preferably using symmetric encryption, with said encryption key obtaining an intermediate ciphertext comprising the encrypted blocks, and d) linear transforming the intermediate ciphertext based on additive contravalence operations to obtain a final ciphertext.

IA system for encrypting data according to an embodiment of the invention based on an all-or-nothing encryption is defined, preferably in form of a computer, one or more processes and/or security modules. The system includes an input module operable to provide data to be encrypted, preferably in form of a plaintext bitstream, and an encryption key, an encryption module operable to divide said data provided by the input module into an odd number of blocks, such that each of said blocks has the same size and to encrypt said blocks, preferably using symmetric encryption, with said encryption key obtaining an intermediate ciphertext comprising the encrypted blocks, and a transformation module operable to transform linearly the intermediate ciphertext based on additive contravalence operations to obtain a final ciphertext.

In an embodiment of the invention, only one round of encryption and one round of additive contravalence operations are necessary thus providing enhanced efficiency.

In an embodiment of the invention, an efficient semantic security scheme, preferably a symmetric encryption scheme, with an efficient linear transformation is provided.

In an embodiment of the invention, a recovery of a plaintext is not allowed even if the encryption key is known to an adversary. In particular even if the encryption key is known to the public the provided method and system still enable semantic security.

In an embodiment of the invention, on input of a plaintext bitstream and an encryption key K, a plaintext is divided into blocks $p_1, \ldots, P_N$, where N is odd such that each block size has size I, wherein I is preferably the block size of particular block cipher used. The set of input blocks $p_1, \ldots, P_N$ is then encrypted under the encryption key K resulting in the intermediate ciphertext $c'=\{S, c_1', \ldots, c_N'\}$, preferably S is a random seed and set as $c_0'$. When the linear transformation is applied on the intermediate ciphertext then the final ciphertext is obtained by additive contravalence operations, preferably addition and multiplications are implemented by means of XOR and AND operations, respectively.

Given the encryption key K the intermediate ciphertext c' can be computed by the final ciphertext c using the corresponding inverse operation of the linear transformation and decrypting the intermediate ciphertext c' with the encryption key K.

In the following it is shown that the method and system according to an embodiment of the invention is based on an all-or-nothing encryption: When the intermediate ciphertext is $c'=c_1', \ldots, c_N'$ with N being an odd number and when the ciphertext c is an all-or-nothing encryption with the parameters $c_0', \ldots, c_N'$, then when given any N blocks of the final ciphertext c an adversary can only recover one block of the intermediate ciphertext c':

Without loss of generality, it may be assumed that the adversary is given blocks $c_0 \ldots C_{(N-1)}$. Since N is odd, it is easy to compute $c_N' = c_0$ XOR $c_1$ XOR $\ldots c_{(N-1)}$.

The set of remaining unknown blocks, i.e., $=c_1' \ldots c_{(N-1)}'$ can be computed as $[c_0 \ldots c_N]*M$ where M is an N-by-N matrix with diagonal elements set to the value 0 and other elements set to the value 1. The Matrix M has the rank N−1, since, e.g., the last column can be computed XOR-ing the first N−1 columns. As the matrix does not have full rank and because the output of steps a)-d) of the provided method is pseudo-random, it is computationally infeasible for an adversary to recover all unknown $c_1' \ldots c_{(N-1)}'$.

However it further can be shown that given the final ciphertext blocks $c_0 \ldots c_{(N-1)}$ and once recovered the intermediate ciphertext block $c_N'$, it is computationally infeasible to recover any other block.

It can be assumed that if an adversary could correctly compute one intermediate ciphertext block $c_{i\_}'$, then the adversary could correctly compute all other unknown intermediate ciphertext blocks $c_1' \ldots c_{(N-1)}'$. Nevertheless, this contradicts the aforementioned observation that, given N elements of the final ciphertext c, it is computationally infeasible to recover all elements in the intermediate ciphertext c'.

Therefore it can be concluded that given N blocks of the final ciphertext c, all but one block in the intermediate ciphertext c' are undetermined.

In the following it is shown that when a block of the plaintext $p_i = F(c_i, c_j)$ with F being the block cipher with $i \neq j$ for a given F( ), the method and system according to the invention ensure that an adversary who has all final ciphertext blocks but one and also the encryption key K cannot require any plaintext block.

Therefore based on the above that only one block of the intermediate ciphertext $c_j'$ can be recovered given any N blocks of the final ciphertext c, it can be assumed that an adversary when given the encryption key K and one block of the intermediate ciphertext $c_j'$ the following situations may occur:

It is computationally infeasible to compute a plaintext block $p_j$, since $p_i = F(c_j, c_i')$ and $c_i'$ is a pseudo-random bitstring of size 1 that is unknown to the adversary.

It is computationally infeasible to compute a plaintext block $p_i$, with $i<j$, since $p_i$ is (computationally) independent from $c_j'$, It is computationally infeasible to compute a plaintext block $p_{j+1}$, since $p_{j+1} = F(c_{j+1}', c_k')$, with $k<j+1$ and $c_k'$ and $c_{j+1}'$ are a pseudo-random bitstring of size 1 that are unknown to the adversary.

It is computationally infeasible to compute $p_j$ with $j>i+1$ since $p_j = F(c_j, c_m')$ and both $c_m, c_j'$ are two pseudo-random bitstrings of size 1 that are unknown to the adversary.

Therefore if the adversary has access only to the secret encryption key K and to any N blocks in the final ciphertext c the adversary cannot acquire any meaningful information about the plaintext p. This ensures one-way security of the plaintext. It can be even further shown that given the encryption key K and all but two of the final ciphertext blocks, then the semantic security of the plaintext can be guaranteed.

According to a preferred embodiment the encryption key is publicly known. This enables for example to provide the encryption key to key management servers or systems enhancing the flexibility of the method allowing the use of key management and lowering the security restrictions on disclosure of the encryption key.

According to a further preferred embodiment linear transforming the intermediate ciphertext is performed using a single matrix multiplication with the vector representing the intermediate ciphertext. This enables to easily compute the linear transformation of the intermediate ciphertext to obtain the final ciphertext. A further advantage is that the linear transformation can be performed parallel.

According to a further preferred embodiment the matrix is provided invertible and identical to its invertible, preferably wherein the matrix is provided in form of a diagonal matrix having the value 0 on the diagonal and the value 1 otherwise. This further enhances the efficiency when linear transforming the intermediate ciphertext and saves storage for the matrix since only a bitwise storage for each entry of the matrix has to be provided.

According to a further preferred embodiment the vector-matrix multiplication is performed using XOR- and AND-operations. This enables an efficient computation of the vector matrix multiplication.

According to a further preferred embodiment after step d) the final ciphertext, preferably represented in form a vector, comprises blocks, wherein each block is represented by the sum of all encrypted blocks of the intermediate ciphertext prior to step c) without the corresponding encrypted block corresponding to the same position in the intermediate ciphertext prior to step d). This provides an all-or-nothing encryption based on a block cipher encryption in the cipher block chaining mode.

According to a further preferred embodiment the steps c)-d) are performed by 7a) recursively encrypting each plaintext block of the actual round using the encryption key combined, preferably via an XOR-operation, with an encrypted plaintext block of the round before resulting in corresponding blocks of the intermediate ciphertext;
7b) directly summing up all intermediate ciphertext blocks according to step 7a); and
7c) generating the blocks of the final ciphertext by directly summing up the result of step 7b) and the corresponding block of the intermediate ciphertext.

This provides an efficient implementation of cipher block chaining encryption mode for performing step c)-d).

According to a further preferred embodiment the blocks of the final ciphertext are distributed among at least two different storage servers, preferably providing at least two different storage services. This further enhances the security since the final ciphertext is distributed among different storage servers. The security can be even further enhanced when the different storage servers run on different operating systems so that a security leak of one storage service can not be used to access the other storage service of the other storage server(s).

According to a further preferred embodiment each storage server stores at least two blocks of the final ciphertext. This enables to efficiently use a limited number of servers for storing the blocks of the final ciphertext without loosing the high level of security for the encrypted data.

According to a further preferred embodiment random data is added as a block into the intermediate ciphertext, preferably added at the beginning of the intermediate ciphertext. This provides an easy implementation of a random seed for encryption as well as an initial block of the intermediate ciphertext.

According to a further preferred embodiment even intermediate ciphertext blocks are generated based on an XOR-operation with the corresponding plaintext block and the result of an encryption of the random seed and the respective even number and odd ciphertext blocks are a result of an encryption of the corresponding plaintext block and an XOR-operation with the previously generated even intermediate ciphertext block. This enables parallelizing the generation of the intermediate ciphertext blocks resulting in a further enhanced efficiency.

According to a further preferred embodiment for performing encryption according to step b) a semantically secure encryption and symmetric encryption scheme is used, preferably counter mode encryption, cipher block chaining mode encryption, output feedback mode encryption and/or cipher feedback mode encryption. This enables to select the most appropriate encryption. For example using the outback feedback mode encryption allows to generate the bit sequence with which a plaintext is bitwise XOR-combined in advance, whereas the block chaining mode encryption provides different ciphertext blocks in case of identical plaintext blocks.

FIG. 1 shows that an all-or-nothing encryption of data according to a first embodiment of the present invention.

In FIG. 1 a possible instantiation for an encoding procedure guaranteeing an all-or-nothing encryption is shown.

In FIG. 1 the encoding procedure corresponds to block cipher encryption in the CBC mode. On input of an initialization vector IV which is set as first intermediate ciphertext block the other blocks of the intermediate cipher $\underline{c_i}$ are represented by the result of an encryption with encryption key K of the direct sum of the i-th plaintext block $p_i$ and the previous intermediate cipher block $c_{i-1}'$, cf line 4 in FIG. 1. Then—cf. line 6—the direct sum of all intermediate cipher blocks $c_0', \ldots, c_N'$ is computed and then the final ciphertext blocks $c_i$ are computed by directly adding t and the corresponding intermediate cipher block $\underline{c_i}$, cf. line 8 in FIG. 1.

In another example the intermediate ciphertext $c'=S, c_1, \ldots, c_N$ wherein S is a random seed maybe constructed as follows:
$c_i'=p_i$ XOR Enc_k (S||i), when i MOD 2=0.
$c_i'=$Enc_k ($p_i$ XOR c(i-1')), when i MOD 2=1.
Thus this may be seen as a combination of both the counter mode and the cipher block chaining encryption modes.

FIG. 2 shows principal steps of a method according to a second embodiment of the present invention.

In FIG. 2 steps of a method according to a further embodiment are shown:

In a first step the plaintext p is divided into N plaintext blocks $p_1, \ldots, p_N$, wherein N is odd. Then each of the plaintext blocks $p_1, \ldots, p_N$, is encoded by using for example AES resulting in the intermediate ciphertext blocks $c_1', \ldots, c_N'$. After that an intermediate overall ciphertext t is computed by using the direct sum of all intermediate ciphertext blocks. In a further step each intermediate ciphertext block $\underline{c_i}$ and the intermediate overall ciphertext t are directly added resulting in the corresponding final ciphertext block $c_1, \ldots, c_N$. The resulting final ciphertext blocks $c_1, \ldots, c_N$ are then combined to the ciphertext c.

If the encryption key k is secret then the provided encryption method is semantically secure. If the encryption key is public and all but one ciphertext block is known then the encryption method is one way and if the encryption key is given and all but two ciphertext blocks are known then the encryption method is also semantically secure.

To further enhance security the different obtained final ciphertext block $c_1, \ldots, c_N$ can be distributed on different servers of a distributed storage providing different storage services. Preferably each server stores a plurality of final ciphertext blocks.

In summary the present invention provides an efficient semantic security scheme with an efficient linear transformation. The present invention first encrypts and then applies a linear transform in contrast to conventional all-or-nothing encryption methods.

The present invention provides a fast all-or-nothing encryption and requires only one round of encryption and one round of bitwise XOR operations. The present invention enables semantic security since the underlying encryption is semantically secure and does not allow the recovery of plaintext even if the encryption key is known to an adversary. In particular even when the encryption key is known to the public the present invention still provides semantic security even when all but two of the final ciphertext blocks can be accessed.

One of the advantages of the present invention is that the all-or-nothing encryption according to the invention is efficient, in particular improving the performance of conventional all-or-nothing methods.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for encrypting data based on all-or-nothing encryption, the method comprising:
   a) providing, by an encryption system, data to be encrypted and an encryption key;
   b) dividing, by the encryption system, the data into an odd number of blocks, wherein each of the odd number of blocks has the same size;
   c) encrypting, by the encryption system, the blocks, with the encryption key to obtain an intermediate ciphertext that includes the encrypted blocks; and
   d) linearly transforming, by the encryption system, using multiplication of a single matrix with a vector representing the intermediate ciphertext, the intermediate ciphertext to obtain a final ciphertext, wherein the multiplication of the single matrix with the vector is performed using exclusive or (XOR) and AND operations;
   wherein blocks of the final ciphertext are distributed among at least two different storage servers, and each storage server stores at least two blocks of the final ciphertext;
   wherein each block of the final ciphertext corresponds to:
      an intermediate overall ciphertext corresponding to a direct sum of all encrypted blocks of the intermediate ciphertext, XOR'ed with
      an encrypted block of the intermediate ciphertext corresponding to a same position as the respective block of the final ciphertext.

2. The method according to claim 1, wherein the encryption key is publicly known.

3. The method according to claim 1, wherein the single matrix is identical to the inverse of the single matrix.

4. The method according to claim 1, wherein the steps c)-d) are performed by:
   7a) recursively encrypting each plaintext block of an actual round using the encryption key combined with an encrypted plaintext block of the round before resulting in corresponding blocks of the intermediate ciphertext,
   7b) directly summing up all intermediate ciphertext blocks according to step 7a), and
   7c) generating the blocks of the final ciphertext by directly summing up a result of step 7b) and a corresponding block of the intermediate ciphertext.

5. The method according to claim 1, wherein random data is added as a block into the intermediate ciphertext.

6. The method according to claim 1, wherein performing the encryption uses a semantically secure encryption and symmetric encryption scheme.

7. The method according to claim 1, wherein even intermediate ciphertext blocks are generated based on an exclusive or (XOR) operation with a corresponding plaintext block and a result of an encryption of a random seed and a respective even number, and wherein odd intermediate ciphertext blocks are a result of an encryption of the corresponding plaintext block and an XOR operation with the previously generated even intermediate ciphertext block.

8. The method according to claim 1, wherein the data to be encrypted is provided in the form of a plaintext bitstream, wherein the encryption key is secret or publicly known, and wherein the encrypting the blocks is performed using symmetric encryption.

9. The method according to claim 1, wherein the matrix is provided in the form of a diagonal matrix having a value 1 on the diagonal and a value 0 otherwise.

10. The method according to claim 1, wherein the final ciphertext is represented in the form of a vector.

11. The method according to claim 4, wherein each plaintext block of the actual round using the encryption key is combined with an encrypted plaintext block of the round before via an exclusive or (XOR) operation.

12. The method according to claim 1, wherein the at least two different storage servers provide at least two different storage services.

13. The method according to claim 5, wherein the random data is added at the beginning of the intermediate ciphertext.

14. The method according to claim 6, wherein performing the encryption uses at least one of counter mode encryption, cipher block chaining mode encryption, output feedback mode encryption, or cipher feedback mode encryption.

15. A non-transitory computer-readable medium having processor-executable instructions stored thereon for encrypting data based on all-or-nothing encryption, the processor-executable instructions when executed, facilitating performance of the following:
   a) providing data to be encrypted and an encryption key;
   b) dividing the data into an odd number of blocks, wherein each of the odd number of blocks has the same size;
   c) encrypting the blocks with the encryption key to obtain an intermediate ciphertext that includes the encrypted blocks; and
   d) linearly transforming using multiplication of a single matrix with a vector representing the intermediate ciphertext, the intermediate ciphertext to obtain a final ciphertext, wherein the multiplication of the single matrix with the vector is performed using exclusive or (XOR) and AND operations;
   wherein blocks of the final ciphertext are distributed among at least two different storage servers, and each storage server stores at least two blocks of the final ciphertext;
   wherein each block of the final ciphertext corresponds to:
      an intermediate overall ciphertext corresponding to a direct sum of all encrypted blocks of the intermediate ciphertext, XOR'ed with
      an encrypted block of the intermediate ciphertext corresponding to a same position as the respective block of the final ciphertext.

* * * * *